July 26, 1938. B. H. CAMPBELL 2,125,219
RHEOSTAT FOR AN ELECTRICAL BATTERY INDICATOR
Filed Nov. 18, 1936
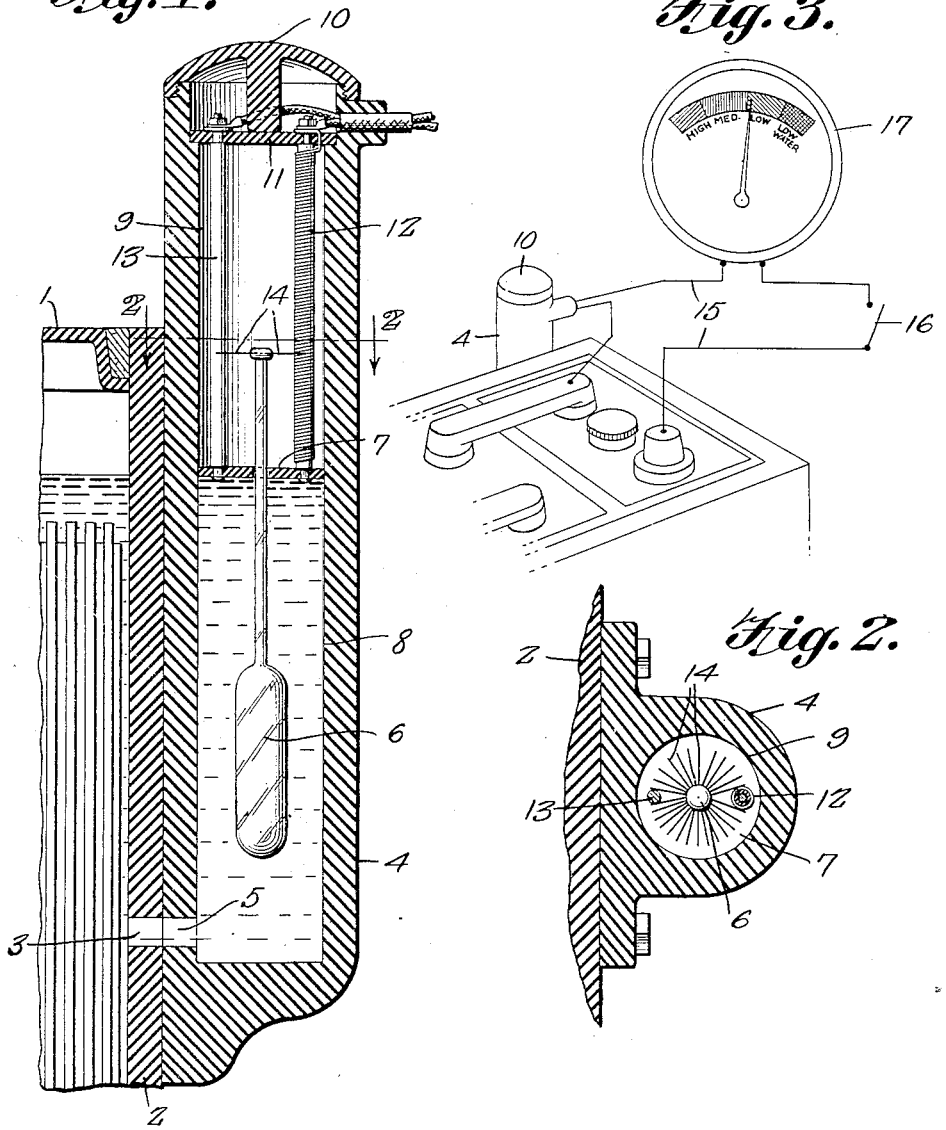
Bruce H. Campbell,
INVENTOR
BY Victor J. Evans & Co.
ATTORNEYS Patented July 26, 1938

2,125,219

UNITED STATES PATENT OFFICE 2,125,219

RHEOSTAT FOR AN ELECTRICAL BATTERY INDICATOR

Bruce H. Campbell, Atlanta, Ga.

Application November 18, 1936, Serial No. 111,551

1 Claim. (Cl. 201—62)

This invention relates to a rheostat for an electrical battery indicator and has for the primary object the provision of a device of this character which may be readily connected in an electric circuit of an indicator and adapted for actuation by the specific gravity of the fluid of a storage battery to bring about operation of the indicator to permit a person to easily ascertain the approximate electrical charge of said battery.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating my invention applied to a battery.

Figure 2 is a sectional view taken on the line 2—2 of Figure 1.

Figure 3 is a fragmentary perspective view illustrating an electrical connection between my invention and the battery.

Referring in detail to the drawing, the numeral 1 indicates a storage battery and to adapt my invention to the battery, the casing 2 thereof is provided with a port 3 and secured to the casing is a float chamber 4 provided with a port 5 aligning with the port 3 so that the fluid of the battery may seek its level within the float chamber. A float 6 operates in the float chamber and has its movement guided by a partition 7 separating the float chamber into a fluid compartment 8 and a compartment 9 to receive electrical appliances. The chamber 9 is closed by a removable cap 10 and has located therein a partition 11. The partitions 7 and 11 support in spaced relation an electrical resistance coil 12 and a contact rod 13. The stem or rod of the float 6 operates between the resistance coil and the contact rod and has secured thereto cat whiskers 14 which have wiping engagement with the resistance coil 12 and the contact rod 13. An electric circuit 15 is connected to terminals of the battery 1, as shown in Figure 3, and to the resistance coil 12 and the contact rod 13. The circuit 15 includes a switch 16 and is also connected to a meter 17. The meter is of the conventional construction for the purpose of indicating the charge in the battery. The face or dial of the meter may have any suitable graduations thereon or divided, as shown in Figure 3, into blocks titled "high", "medium", "low" and "low water". The indicating hand of the meter moves over the blocks, according to the charge of the battery. The float 6 rises and falls in accordance with the specific gravity of the fluid or electrolyte of the battery and the float and cat whiskers thereof moving relative to the resistance coil varies the positions of the indicator hand of the meter over the face of the latter so that the operator, pilot or driver can readily ascertain the charge in the battery. The switch 16 controls the electrical circuit.

Having described the invention, I claim:

A rheostat for battery indicators comprising a supporting partition of insulating material, a contact rod secured to and depending from said partition and including a terminal extending above said partition for connection in an electric circuit of an indicator, a resistance coil secured to and depending from the partition and paralleling and spaced from the contact rod and including a terminal at the upper end and arranged above the partition for connection in the electric circuit, a second partition of insulating material connecting the lower ends of the contact rod and the resistance coil and cooperating with the first partition in maintaining the contact rod and resistance coil in spaced relation and provided with an opening between said contact rod and the resistance coil, a float stem slidable in said opening, a float for said stem, and a plurality of flexible contact elements extending through the stem and carried thereby for engagement with the contact rod and the resistance coil.

BRUCE H. CAMPBELL.